(12) United States Patent
Vialatte et al.

(10) Patent No.: US 6,283,550 B1
(45) Date of Patent: Sep. 4, 2001

(54) VEHICLE SEAT WITH AUTOMATIC FRONT ANCHORING, AND VEHICLE COMPRISING SUCH A SEAT

(75) Inventors: Emmanuel Vialatte, Etampes; Jean-Noël Castrec, Nozay, both of (FR)

(73) Assignee: Bertrand Faure Equipements SA, Boulogne (FR)

( * ) Notice: Subject to any disclaimer, the term of this patent is extended or adjusted under 35 U.S.C. 154(b) by 0 days.

(21) Appl. No.: 09/338,358

(22) Filed: Jun. 23, 1999

(30) Foreign Application Priority Data

Jun. 26, 1998 (FR) .................................................. 98 08149

(51) Int. Cl.⁷ ...................................................... A47C 1/02
(52) U.S. Cl. ...................... 297/335; 297/336; 248/503.1; 296/65.03
(58) Field of Search ...................... 296/65.03; 248/503.1; 297/335, 336

(56) References Cited

U.S. PATENT DOCUMENTS

| 5,330,245 | 7/1994 | Boisset . | |
|---|---|---|---|
| 5,482,345 | * 1/1996 | Bolsworth et al. | 296/65.03 |
| 5,498,051 | 3/1996 | Sponsler et al. . | |
| 5,562,322 | * 10/1996 | Christoffel | 248/503.1 X |
| 5,743,596 | * 4/1998 | Chabanne | 297/335 X |
| 5,765,894 | * 6/1998 | Okazaki et al. | 296/65.03 |
| 5,915,779 | * 6/1999 | Duchateau | 297/336 X |
| 6,065,804 | * 5/2000 | Tanaka et al. | 296/65.03 X |

FOREIGN PATENT DOCUMENTS

| 0 781 681 | 7/1997 | (EP) . |
| 860 746 | 1/1941 | (FR) . |
| 2 684 934 | 6/1993 | (FR) . |

* cited by examiner

*Primary Examiner*—Laurie K. Cranmer
(74) *Attorney, Agent, or Firm*—Marshall, O'Toole, Gerstein, Murray & Borun

(57) ABSTRACT

It relates to a vehicle seat comprising a seat part which is mounted on the vehicle floor by means of a front connection including a catch. This catch is provided with a notch intended to engage with a first horizontal transverse spindle integral with the floor in order to pivot the seat rearwards around said first spindle and to bring it into a use position where the seat part extends substantially horizontally. A finger projects frontwards and comprises an upper face turned in the opposite direction to the opening of the notch and intended to abut against stop means in said use position, these stop means being integral with the floor.

11 Claims, 4 Drawing Sheets

VEHICLE SEAT WITH AUTOMATIC FRONT ANCHORING, AND VEHICLE COMPRISING SUCH A SEAT

FIELD OF THE INVENTION

The present invention relates to seats of vehicles which have a seat part adapted to be mounted on the vehicle floor by means of a rear connection and a front connection which includes a catch, and to vehicles comprising such seats.

BACKGROUND OF THE INVENTION

Seats of this type are known from FR-A-2 684 934. Even when the immobilization of these seats gives complete satisfaction, the installing and anchoring of them on the vehicle floor is quite difficult.

Moreover, such seats have the disadvantage of having connections made up from a substantial number of parts, and therefore expensive to make.

SUMMARY OF THE INVENTION

A particular object of the present invention is to overcome these disadvantages by supplying a seat which can be easily installed on the vehicle floor and removed from this vehicle.

To this end, according to the invention, a seat of the type in question is mainly characterized in that the catch includes:

- a frontwards open notch intended to engage with a first horizontal transverse spindle integral with the floor in order to pivot the seat rearwards, during installation of this seat on the floor from a tipped over position, around said first spindle and to bring it into a use position where the seat part extends substantially horizontally and where the rear connection engages with means of fixing to the floor; and
- a guide surface intended to engage with complementary means integral with the floor in order to bring the notch opposite the first spindle, during installation of the seat.

By means of these arrangements, the installation of the seat on the floor and the removal of the seat out of the vehicle are easy to achieve and the front connection of the seat is positively held on the vehicle floor.

In preferred embodiments of the invention, use may possibly be made moreover of one and/or other of the following arrangements:

- the guide surface is concave and is, in the seat use position, located substantially in front and above the notch;
- the catch additionally includes a finger which projects frontwards in the seat use position, this finger being intended to be inserted between the first spindle and the complementary means during the installation of the seat;
- the finger comprises an upper face which is turned to the opposite side from the notch opening and which is intended to abut against the complementary means in said use position;
- the finger is located substantially in the extension of the notch, being moved toward the front relative to this notch in the use position of the seat;
- the notch has an oblong shape open towards the front of the seat and extends in the longitudinal direction of the seat when this is in the use position so that the catch includes a lower flange intended to abut under the first transverse spindle in said use position;
- the complementary means include a second transverse spindle which is substantially parallel to said first transverse spindle and which is mounted on the vehicle floor;
- the second transverse spindle is located at a level higher than the level of the first transverse spindle, so that the catch can be installed by introduction of the finger between the first and second spindles and by insertion of the first spindle in the notch;
- the seat is pivoting mounted between the use position and a tipped forwards position where the foldable down part of the back is substantially parallel to the seat part, the catch having furthermore a hook acted upon by resilient means in a hooking position where said hook is fastened onto the second spindle when the seat part is in the tipped forwards position;
- the catch includes furthermore a front nose intended to abut on the second transverse spindle in the seat part tipped over position, in order to form with the hook a closed housing enclosing said second spindle;
- the hook is mounted on an arm pivoting on the catch in order to control the opening of the closed housing during the movement of the seat part from its tipped over position to its use position; and
- the finger has a lower face opposite to the upper face and intended, in the seat part tipped over position, to be supported against a stop integral with the floor.

Furthermore, an object of the invention is also a vehicle comprising at least one seat such as defined above, the floor of this vehicle including a first horizontal transverse spindle engaging with the seat catch.

BRIEF DESCRIPTION OF THE DRAWINGS

Other characteristics and advantages of the invention will become evident during the following description of two of its embodiments, given as a non-restrictive, example, compared with the appended drawings, in which.

DETAILED DESCRIPTION OF PREFERRED EMBODIMENTS

Figure 1:
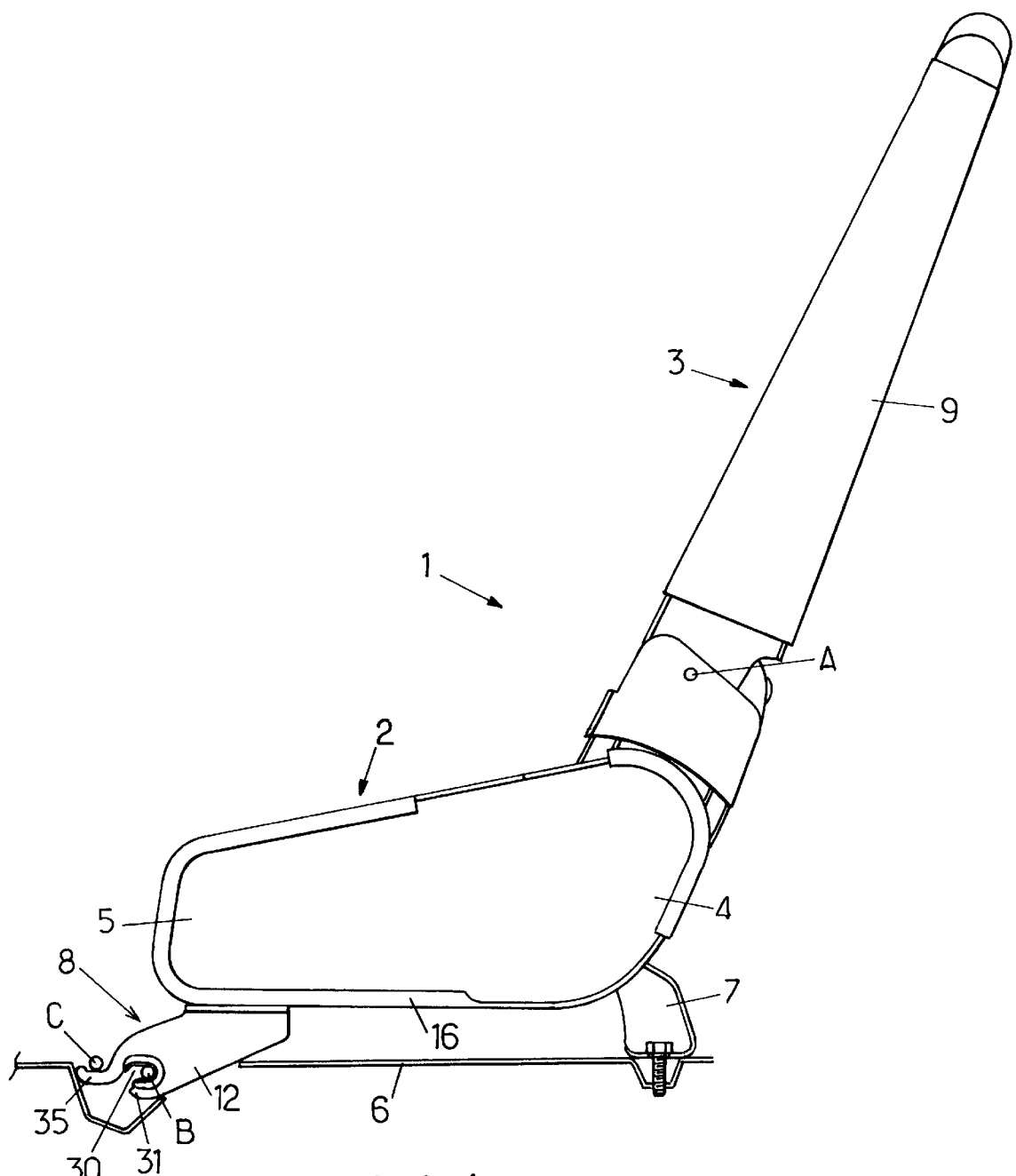
FIG. 1 is a side view of a seat in the normal use position and provided with a front connection according to the present invention.

The automobile vehicle seat 1 shown in FIG. 1 is a fixed seat and comprises, in a way known, per se, a seat part 2 and a back 3.

The seat part 2 extends firstly between one rear end 4 close to the back 3 and one front end 5 distant from the back. This seat part is intended to be fixed in a fixed manner on a floor 6 of an automobile vehicle by means of two identical rear connections or feet 7, only one of which is visible in FIG. 1, and of two front identical connections or feet 8, only one of which is also visible in FIG. 1.

The rear connections 7 are locked by any known means, for example by a screw, to the floor 6 when the seat is in the normal use position.

Furthermore, the back 3 is connected to the seat part 2 by means of a standard pivoting mechanism intended to enable the seat passenger to adjust the inclination of the back.

The front connection 8 is for example made from a stamped and folded metal sheet. This front connection has a vertical web 14 which extends substantially longitudinally relative to the seat direction and from which material is brought a horizontal turned down piece 15 in order to be fixed on the frame 16 of the seat part 2. The web 14 extends, when the seat is in the use position, at a downwards angle between one rear end 17 and one front end 18. It has furthermore a substantially slanting free upper edge 19 and free lower edge 20.

In the lower part of the front end 18 is arranged an oblong shaped notch 30 which opens frontwards. This notch 30 is intended to engage with a first transverse spindle B around which the catch 12 pivots during the positioning of the seat on the vehicle floor.

Figure 4:
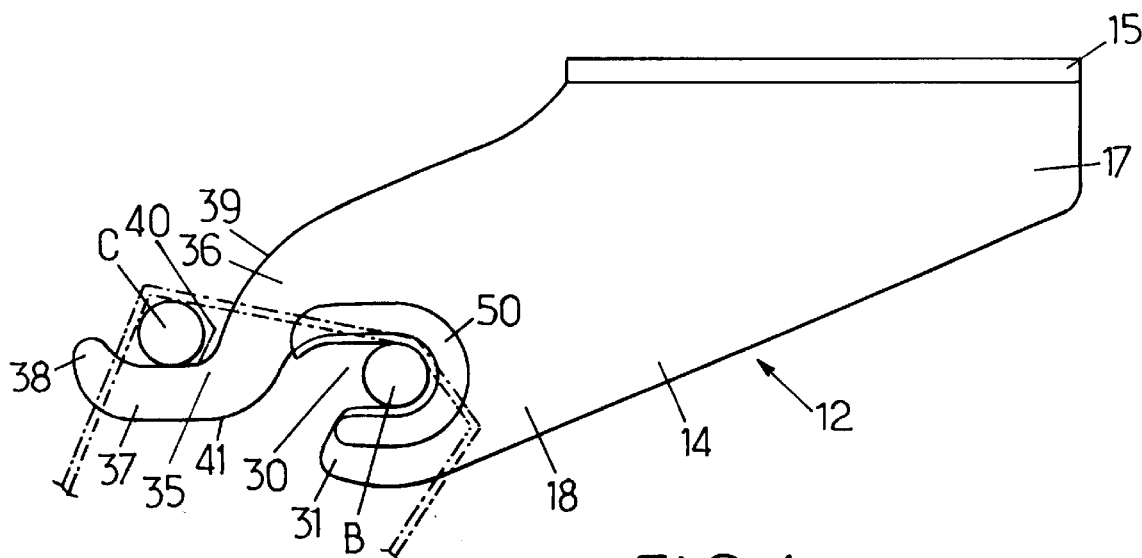
FIG. 4 is a side view of the seat front connection when the seat part is in the normal use position.

The notch 30 and the lower free edge 18 of the web 14 delimit a lower flange 31. When the seat part is in the normal use position, the notch 30 has its axis substantially longitudinal and the lower flange 31 is substantially horizontal (FIG. 4).

The notch 30 and the upper free edge 19 of the web 14 delimit an upper flange 36. This flange projects beyond the opening 30 to the level of a free end 35 and is curved downwards partially enclosing said opening. The upper edge 19 is thus of concave shape defining a guide surface 39.

The free end 35 of the upper flange 36 is separated from the lower flange 31 in order to delimit a passage at least equal to the diameter of the spindle B intended to penetrate into the notch 30.

As a variant, a finger 37 projects forwards from the free end 35 of the upper flange 36, being moved forwards relative to the notch 30.

The finger 37 has a main blade section 38 and a free front part 39. The main blade section 38 extends substantially longitudinally in the extension of the notch whereas the disengaged end of the front part 39 is curved upwards. The main blade section 38 has an upper face 40 turned upwards and a lower face 41 opposite to the upper face 40. These two faces are substantially horizontal (when the seat part 2 is in the normal use position).

A second horizontal spindle C substantially parallel to the first spindle B is mounted integral with the floor 6. This second spindle is located in front of the first spindle, at a distance substantially equal to the length of the notch 30 increased by half the length of the finger 35. It is moreover at a slightly higher level to that of the first spindle B.

Figure 2:
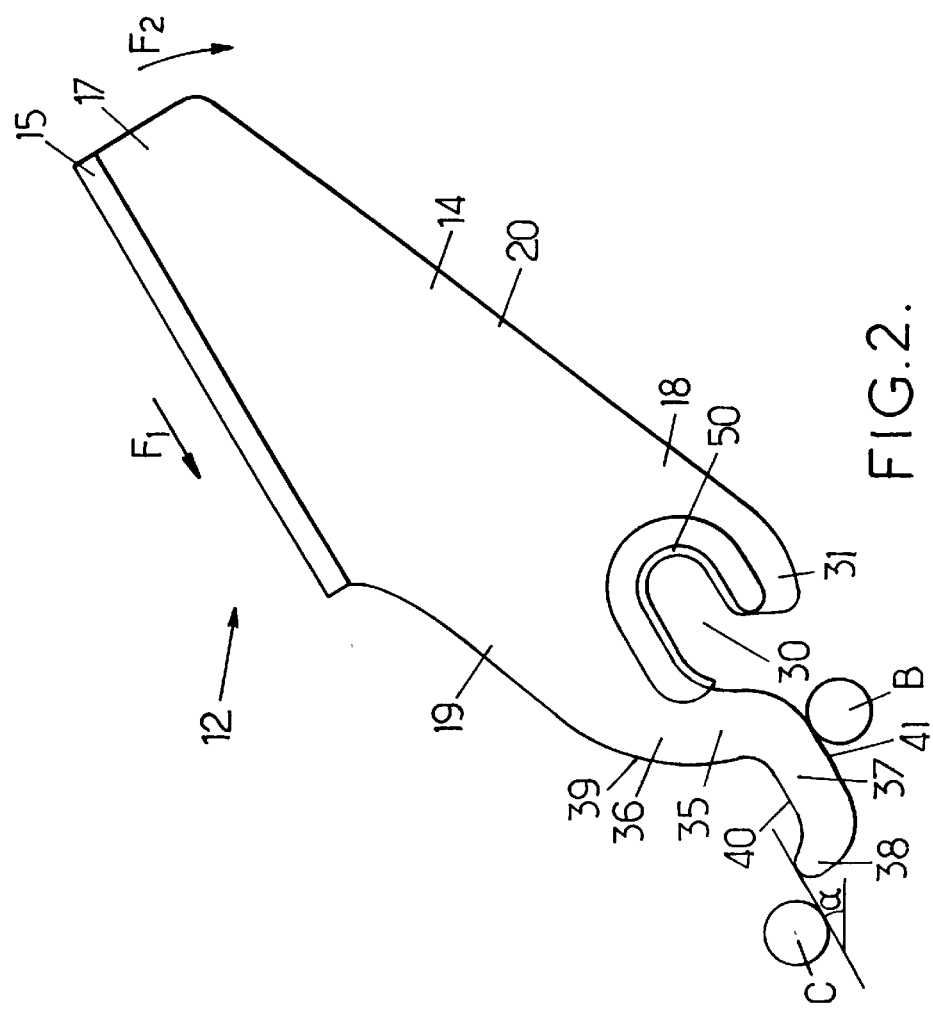

When the user wishes to install the seat 1 on the vehicle floor 6, he inclines the seat part 2 of the seat so that the rear end 4 is at a higher level than the front end 5. The catch 12 is then inclined downwards as shown in FIG. 2. The user then introduces the seat at an angle α (of the order of 30°) relative to the floor 6 in order to insert the finger 37 between the first spindle B and the second spindle C, then causes a translation of the seat in the direction of the arrow F1 to engage the notch 30 with the first spindle B. The upper face 40 of the finger 35 then slides against the second transverse spindle C. The seat is then pivoted downwards in the direction of the arrow F2 so that the seat occupies a horizontal position as shown in FIG. 1. The catch 12 then occupies the position shown in FIG. 4 so that the seat is held by the abutting of the lower flange 31 against the first spindle B and of the upper face 40 of the finger 35 against the second spindle C, the front part 39 of the finger 37 preventing an upwards movement of the front of the seat.

Figure 3:
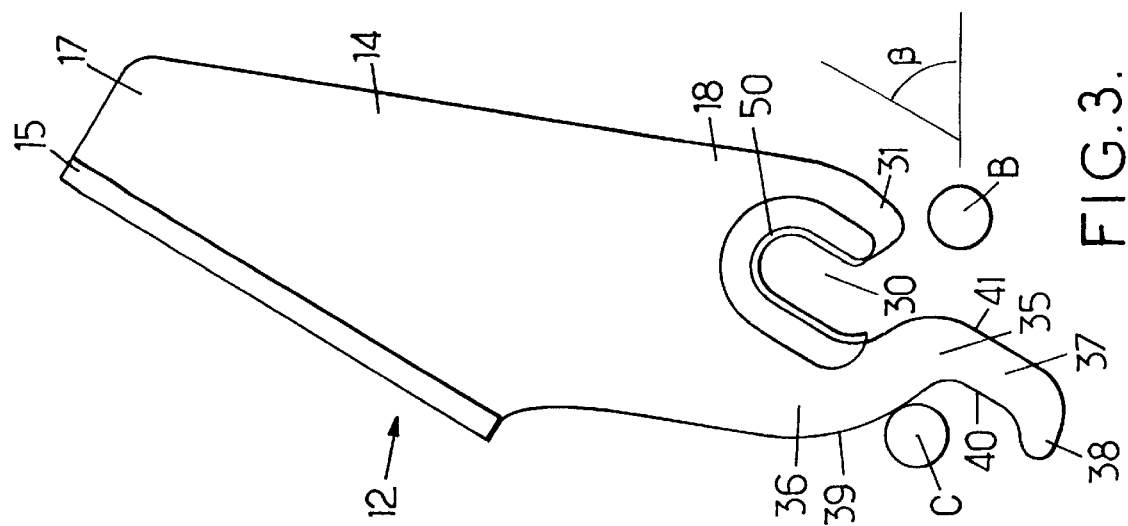
FIGS. 2 and 3 are respectively side views of the front connection of the seat during the installation of the seat of FIG. 1 on the vehicle floor in two different inclination angles.

When the user introduces the seat at an angle β much greater than the previous angle α (for example of the order of 60° to 80°), the catch 12 occupies a substantially vertical position such as shown in FIG. 3. The main blade section 38 of the finger 37 is inserted between the first spindle B and the second spindle C whereas the guide edge 39 of the catch 12 slides along the second spindle C and plays the role of a cam in order to bring the notch 30 in correspondence with the first spindle B. It is sufficient then to pivot the seat as before so that the seat occupies its normal use position and to lock the rear connections 7 on the floor 6.

Figure 7:
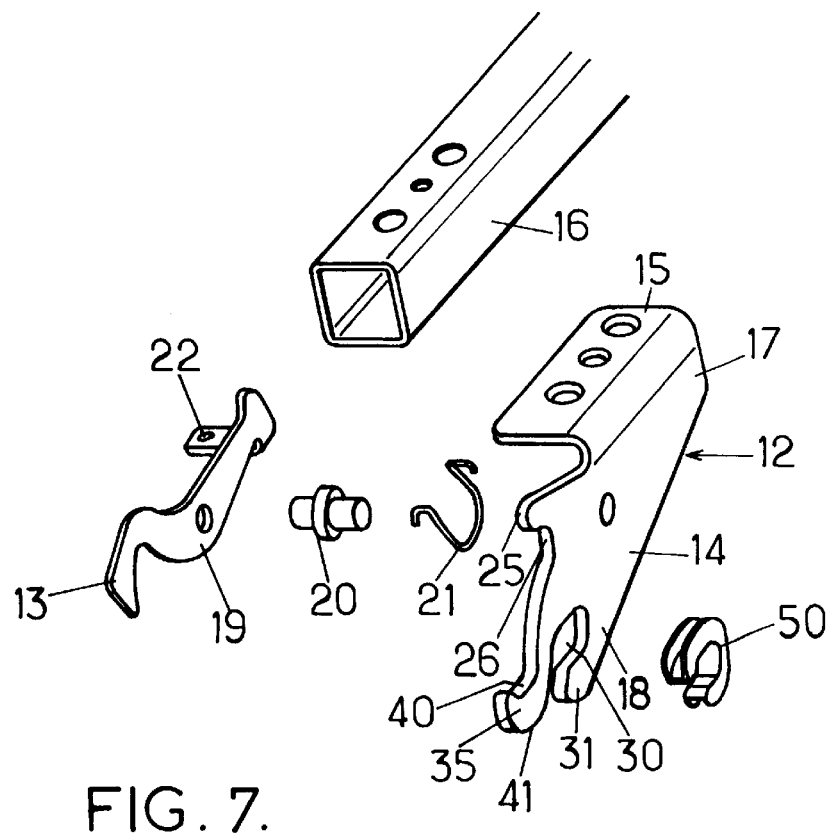
FIG. 7 is an exploded view of the front connection of the seat of FIGS. 5 and 6.
Figure 6:
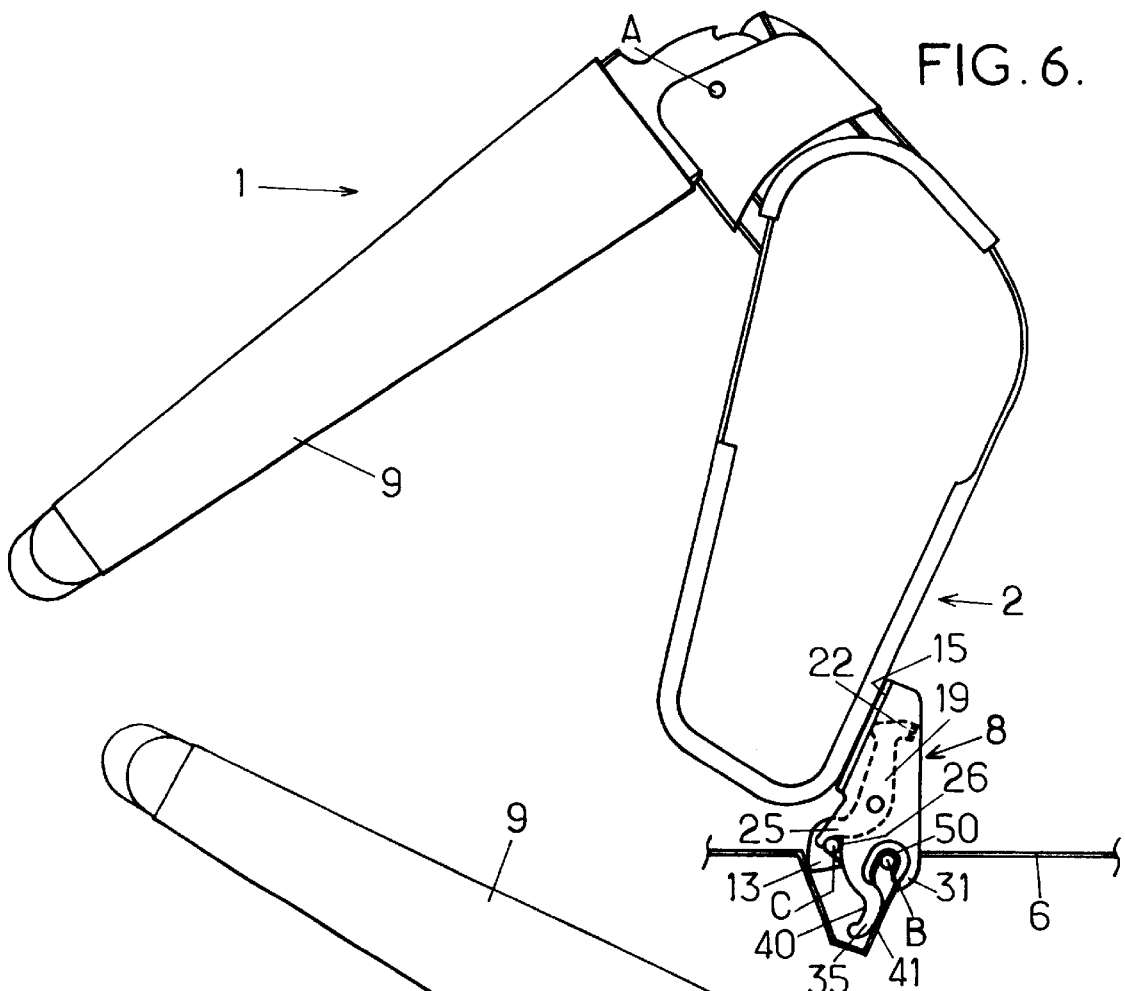
FIG. 5 and 6 are respectively side views of a variant of the seat when the seat part is in the normal horizontal use position and in the tipped forwards position.
Figure 5:
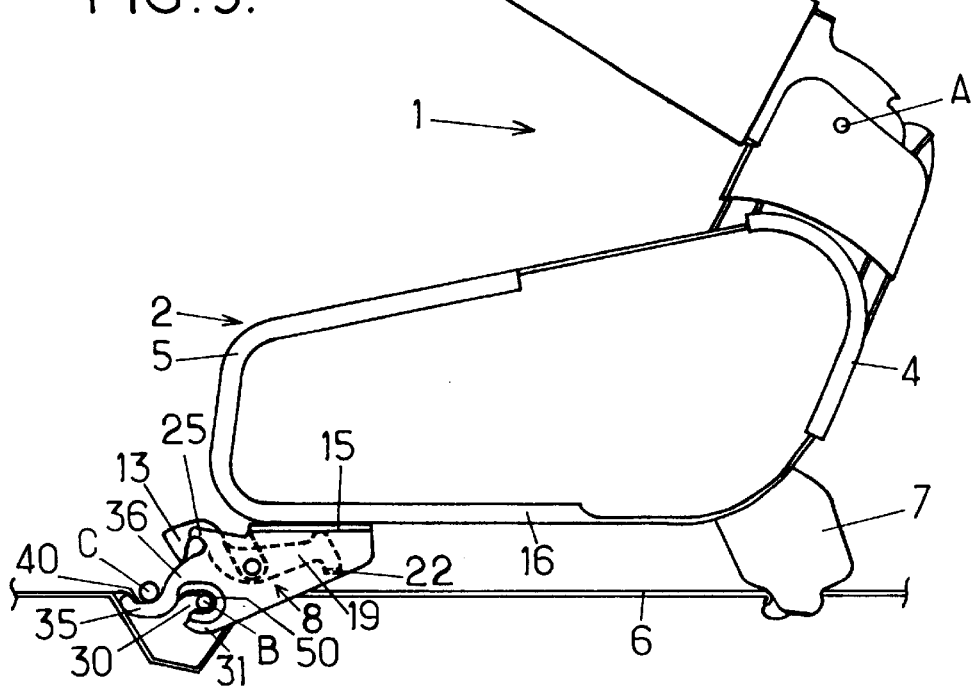

According to another variant shown in FIGS. 5 to 7, the seat is a movable seat.

The rear connections 7 are locked to the floor 6 when the seat is in the normal use position and unlocked from this floor in order to tip the seat forwards; they are known in themselves and will not be described here in detail.

The back 3 is composed moreover of a foldable down part 9 able to pivot around a third horizontal transverse spindle A between a raised use position such as shown in FIG. 1 and a folded down position such as shown in FIGS. 5 and 6 in which the foldable down part 9 is substantially parallel to the seat part 2.

The seat part 2 can thus occupy every position between the two following angular positions:
- a normal use position where the seat part 2 extends substantially horizontally relative to the vehicle floor 6 and in which the four connections 7, 8 of the seat part are all fixed to the floor;
- and a tipped forwards position in which the foldable down part 9 of the back 3 has been folded down parallel to the seat part 2, the connections 7 having been disconnected from the floor whereas. the connections 8 have tipped over around the first horizontal transverse spindle B which is fixed to the floor 6 and which is approximately parallel to the third spindle A. The connections 8 moreover immobilize the seat part 2 in this position by engaging with the second transverse spindle C as will be described below.

The connection 8 (FIG. 7) comprises the same components as before. The catch 12 is furthermore provided with a pivoting hook 13.

The hook 13 is carried (FIGS. 5 to 7) by an arm 19 pivoting mounted on the web 14 by means of a pivot pin 20. The arm 19 is placed between the structure 16 and the web 14 and is acted upon by resilient means such as a spring 21 in order to place the hook 13 in the closed position on the front end 18. On the opposite side of the hook 13, the arm 19 has a lug 22 intended to be activated by the user of the seat in order to open the hook 13.

Furthermore, the arm 19 is arranged in the upper part of the front end 18, so that the hook 13 is placed opposite a nose 25 integral with the web 14 and projecting forwards relative to the end 18 so as to define a forwards turned support edge 26 in the shape of a circular arc. The support edge 26 and the hook 13 are intended to engage, in the tipped forwards position of the seat part 2, with the second horizontal spindle C (FIG. 6).

The installation of the seat on the floor 6 is obtained in the same way as before. During downwards movement of the catch 12, the hook 13 comes into support against the second spindle C which causes the opening of this hook so that the support edge 25 abuts against the second spindle C. The catch 12 then occupies the position shown in FIG. 6. The hook 13 encloses this spindle C so that the seat part is held against any rearward movement. Furthermore, the finger 35 is supported by its lower face 41 against a stop 45 connected to the vehicle floor 6. The support of the lower face 41 against the stop 45 enables the seat part to be held against any forward movement.

When the seat part 2 is brought into the tipped forwards position, the hook 13 locks automatically on the second spindle C in order to positively hold the seat part in this position.

In the tipped forwards position, the seat part 2 pivots around the second spindle C but the respective positions of the first spindle B, the second spindle C and the finger 37 enable a clearance of the seat 2, the spindle B thus being able to occupy an intermediate position in the notch 30.

To remove the seat when the seat part is in the normal use position, it is sufficient to unlock the connections 7 in a way known per se and to tip the whole of the seat forwards in order to remove the seat by an upwards and rearwards movement to disengage the finger 35 from the spindles B and C, and the spindle B from the notch 30.

To remove the seat when the seat part is in the tipped forwards position, it is sufficient to open the hook 13 by pressing on the lug 22 of the arm 19, then to cause an upwards movement of the seat until the finger 37 is disengaged from the two spindles B and C.

In the two embodiments, the catch 12 is for example made in folded sheet metal. In order to reduce the noise, an anti-noise part 50 made from plastic material is fitted on the edges of the notch 30 and is intended to engage with the spindle B. The floor stop 45 can for example carry a rubber part.

Finally, the transverse spindles B and C are placed under the level of the floor 6 in order to make more room under the seat part of the seat.

What is claimed is:

1. A vehicle seat comprising a seat part adapted to be mounted on the floor of the vehicle by means of a rear connection and a front connection which include at least one catch, wherein the catch comprises:

a frontwards open notch intended to engage with a first transverse horizontal spindle integral with the floor to pivot the seat rearwards, during the installation of this seat on the floor from a tipped over position, around said first spindle and to bring it into a use position where the seat part extends substantially horizontally and where the rear connection engages with means of fixing to the floor;

a guide surface intended to engage with complementary means integral with the floor in order to bring the notch opposite the first spindle, during the installation of the seat, said guide surface being concave and being, in the use position of the seat, located approximately in front of and above the notch; and a finger which projects frontwards in the use position of the seat, this finger being intended to be inserted between the first spindle and the complementary means during the installation of the seat.

2. A vehicle seat according to claim 1, wherein the finger comprises an upper face which is turned in the opposite direction to the opening of the notch and which is intended to abut against the complementary means in said use position.

3. A vehicle seat according to claim 1, wherein the finger is located substantially in an extension of the notch, being moved frontwards relative to this notch in the use position of the seat part.

4. A vehicle seat according to claim 1, wherein the notch is of oblong shape open towards the front of the seat and extending in the longitudinal direction of the seat when this is in the use position so that the catch includes a lower flange intended to abut under the first transverse spindle in said use position.

5. A vehicle seat according to claim 1, wherein the complementary means include a second transverse spindle which is substantially parallel to said first transverse spindle and which is mounted on the vehicle floor.

6. A vehicle seat according to claim 5, wherein the second transverse spindle is located at a higher level than the level of the first transverse spindle, so that the catch can be installed by introduction of the finger between the first and second spindles by insertion of the first spindle in the notch.

7. A vehicle seat according to claim 5, wherein the seat part is pivoting mounted between the use position and a tipped forwards position where the folding down part of the back is substantially parallel to the seat part, the catch carrying furthermore a hook acted upon by a resilient means into a hooking position where said hook is hooked on the second spindle when the seat part is in the tipped forwards position.

8. A vehicle seat according to claim 7, wherein the catch includes moreover a front nose intended to abut on the second transverse spindle in the tipped over position of the seat part, in order to form with the hook a closed housing enclosing said second spindle.

9. A vehicle seat according to claim 8, wherein the hook is mounted on an arm pivoting on the catch in order to control the opening of the closed housing during movement of the seat part from its tipped over position to its use position.

10. A vehicle seat according to claim 9, wherein the finger has a lower face opposite to the upper face and intended, in the seat part tipped over position, to be supported against a stop integral with the floor.

11. An automobile vehicle comprising a seat according to claim 1.

* * * * *